(12) United States Patent
Tonouchi

(10) Patent No.: US 10,296,802 B2
(45) Date of Patent: May 21, 2019

(54) IMAGE PROCESSING DEVICE, IMAGE PROCESSING METHOD, AND COMPUTER PROGRAM PRODUCT

(71) Applicant: Kabushiki Kaisha Toshiba, Minato-ku (JP)

(72) Inventor: Yojiro Tonouchi, Inagi (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 0 days.

(21) Appl. No.: 15/680,293

(22) Filed: Aug. 18, 2017

(65) Prior Publication Data

US 2018/0225536 A1 Aug. 9, 2018

(30) Foreign Application Priority Data

Feb. 3, 2017 (JP) ................................. 2017-018788

(51) Int. Cl.
*G06K 9/00* (2006.01)
*G06K 9/32* (2006.01)
*G06K 9/20* (2006.01)
*G06K 9/34* (2006.01)
*G06K 9/52* (2006.01)

(52) U.S. Cl.
CPC ....... *G06K 9/3208* (2013.01); *G06K 9/00973* (2013.01); *G06K 9/2081* (2013.01); *G06K 9/3233* (2013.01); *G06K 9/3283* (2013.01); *G06K 9/344* (2013.01); *G06K 9/52* (2013.01); *G06K 2209/01* (2013.01)

(58) Field of Classification Search
CPC combination set(s) only.
See application file for complete search history.

(56) References Cited

U.S. PATENT DOCUMENTS

2002/0015524 A1\* 2/2002 Fujiwara ............ G06K 9/00456
382/181
2002/0025081 A1\* 2/2002 Kumazawa .......... G06K 9/3216
382/289
2002/0051575 A1 5/2002 Myers et al.
(Continued)

FOREIGN PATENT DOCUMENTS

JP 2006-119942 A 5/2006
JP 2016-004553 1/2016
(Continued)

OTHER PUBLICATIONS

Fragoso, V. et al. "TranslatAR: A Mobile Augmented Reality Translator", Applications of Computer Vision (WACV), IEEE Workshop on, XP031913615, Jan. 5, 2011, pp. 497-502.
(Continued)

*Primary Examiner* — Alek Kok S Liew
(74) *Attorney, Agent, or Firm* — Oblon, McClelland, Maier & Neustadt, L.L.P.

(57) ABSTRACT

According to an embodiment, an image processing device includes a memory, and one or more hardware processors configured to function as a receiving unit, a specifying unit, and a detecting unit. The receiving unit receives input information input to an image. The specifying unit specifies the position of the input information. The detecting unit detects a character string having a smaller distance to the position than another character string, from the image.

11 Claims, 8 Drawing Sheets

(56) References Cited

U.S. PATENT DOCUMENTS

2011/0090253 A1    4/2011   Good
2015/0371399 A1   12/2015   Tonouchi et al.
2016/0063340 A1    3/2016   Suzuki et al.

FOREIGN PATENT DOCUMENTS

JP          2016-045877      4/2016
WO    WO 2015/163118 A1   10/2015

OTHER PUBLICATIONS

Yojiro Tonouchi, et al., "A Hybrid Approach to Detect Texts in Natural Scenes by Integration of a Connected-component Method and a Sliding-window Method," IWRR, 2014, 14 pages.

http://internet.watch.impress.co.jp/docs/news/683829.html, 5 pages (with English Translation).

http://diy-ilands.com/2015/01/16/google-translate-usage, 13 pages (with English Translation).

* cited by examiner

IMAGE PROCESSING DEVICE, IMAGE PROCESSING METHOD, AND COMPUTER PROGRAM PRODUCT

CROSS-REFERENCE TO RELATED APPLICATIONS

This application is based upon and claims the benefit of priority from Japanese Patent Application No. 2017-018788, filed on Feb. 3, 2017; the entire contents of which are incorporated herein by reference.

FIELD

Embodiments described herein relate generally to an image processing device, an image processing method, and a computer program product.

BACKGROUND

Conventional methods are known that detect a character string written on a name board, a sign, a menu of a restaurant, and others from an image acquired by imaging the character string with a built-in camera in a smartphone, a tablet, and the like.

The conventional techniques, however, have difficulties in accurately detecting a character string with a simple operation input. For example, even if all detection fields indicating character strings can be detected from an image, if the image includes a plurality of character strings, the user needs an operation input to accurately designate his/her target character string from the detection fields. For example, refer to Japanese Patent Application Laid-open No. 2016-004553, Japanese Patent Application Laid-open No. 2016-045877, and Tonouchi Y., Suzuki K., Osada K., A Hybrid Approach to Detect Texts in Natural Scenes by Integration of a Connected-Component Method and a Sliding-Window Method, IWRR 2014 (Singapore).

DETAILED DESCRIPTION

According to an embodiment, an image processing device according includes a memory, and one or more hardware processors configured to function as a receiving unit, a specifying unit, and a detecting unit. The receiving unit receives input information input to an image. The specifying unit specifies the position of the input information. The detecting unit detects a character string having a smaller distance to the position than another character string, from the image.

An embodiment of an image processing device, an image processing method, and a computer program product will now be described with reference to the accompanying drawings.

Exemplary Functional Configuration

Figure 1:
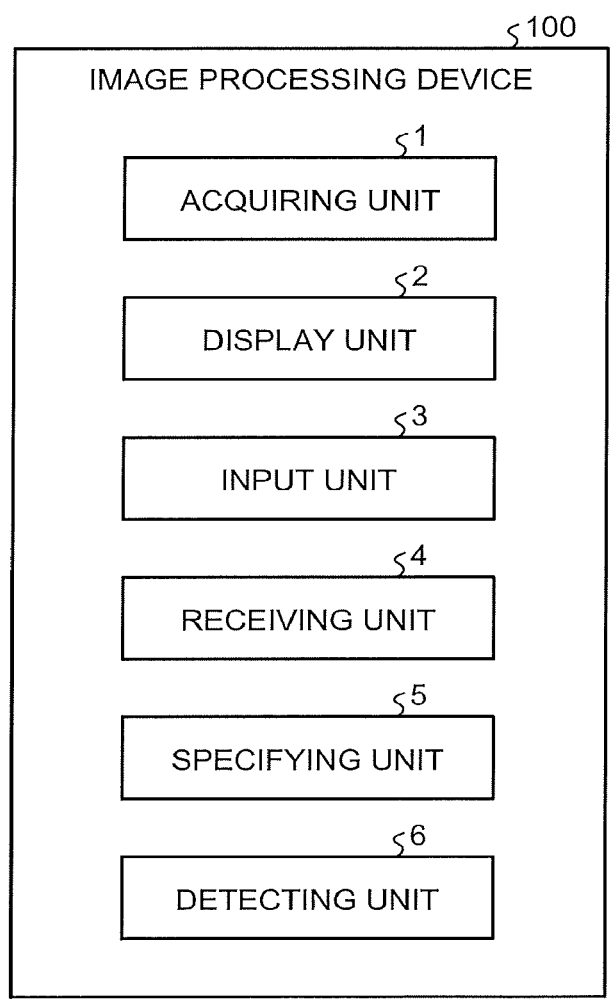
FIG. 1 is a drawing that illustrates an exemplary functional configuration of an image processing device of an embodiment.

FIG. 1 is a drawing that illustrates an exemplary functional configuration of an image processing device 100 of an embodiment. The image processing device 100 of the embodiment includes an acquiring unit 1, a display unit 2, an input unit 3, a receiving unit 4, a specifying unit 5, and a detecting unit 6. Any desired device can serve as the image processing device 100. Examples of the image processing device 100 include a smart device, a personal computer, and a camera.

The acquiring unit 1 acquires an image. Examples of the acquiring unit 1 may include an imaging unit of a camera or the like and a receiving unit of an interface or the like receiving an image taken by another device.

The display unit 2 displays the image acquired by the acquiring unit 1. Examples of the display unit 2 include a liquid crystal display. The input unit 3 receives input information input to the image displayed on the display unit 2. Examples of the input unit 3 include a keyboard and a mouse. Examples of the display unit 2 and the input unit 3 may include a liquid crystal touch panel with a display function and an input function. For example, if the image processing device 100 is a touch pad or a tablet, the display unit 2 and the input unit 3 are implemented by a liquid crystal touch panel.

The receiving unit 4 receives input information input to the image from the input unit 3.

The specifying unit 5 specifies the position of the input information input through an operation of the user. If input information is obtainable in time series by, for example, operating a mouse and tapping a crystal liquid touch panel and the like, the specifying unit 5 specifies a set of instructed positions (xk, yk) on the display screen as input information.

Exemplary input information will now be described.

Exemplary Input Information

Figure 2A:
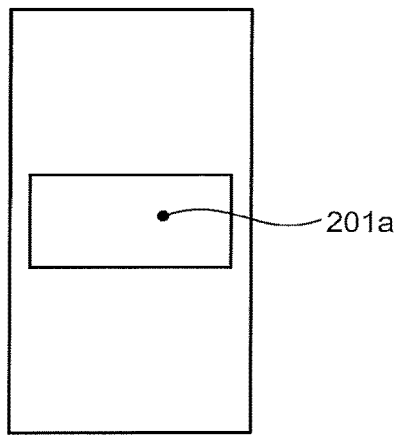
FIG. 2A is a drawing that illustrates exemplary input information of the embodiment.

FIG. 2A is a drawing that illustrates exemplary input information 201a of the embodiment. In the example of FIG. 2A, the input information 201a is represented by a dot, and the specifying unit 5 specifies the input information 201a in (x, y).

Figure 2B:
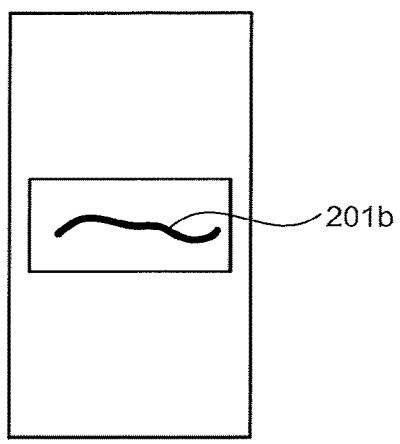
FIG. 2B is a drawing that illustrates exemplary input information of the embodiment.

FIG. 2B is a drawing that illustrates exemplary input information 201b of the embodiment. In the example of FIG. 2B, the input information 201b is represented by a line, and the specifying unit 5 specifies the input information 201b as lines connecting the sequence of points p(k)=(xk, yk) (k=1, 2, ..., K).

Figure 2C:
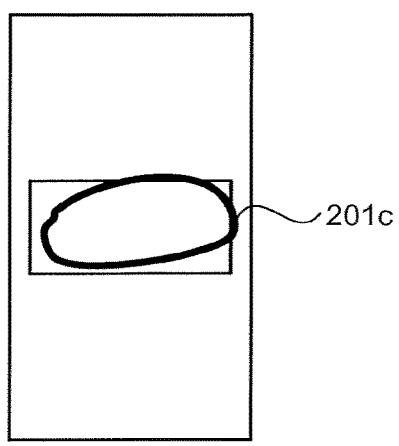
FIG. 2C is a drawing that illustrates exemplary input information of the embodiment.

FIG. 2C is a drawing that illustrates exemplary input information 201c of the embodiment. In the example of FIG. 2C, the input information 201c is represented by a field, and the specifying unit 5 specifies the input information 201c as a field surrounded by lines connecting the sequence of points p(k)=(xk, yk) (k=1, 2, ..., K).

The input information 201a to 201c will be simply referred to as input information 201 unless otherwise separately described.

Referring back to FIG. 1, the detecting unit 6 detects a character string having a smaller distance to the position of the input information 201 than other character strings, from an image.

For example, the detecting unit 6 detects a character string having the smallest distance to the position of the input information 201, from the image. In this case, for example, the detecting unit 6 detects a character string overlapping with the input information 201 from the image. Even with no character strings overlapping with the input information 201, the detecting unit 6 is capable of detecting a character string having the smallest distance to the position of the input information 201, from the image. In another case, the detecting unit 6 detects a certain number of character strings in ascending order from a character string having the smallest distance, out of a plurality of character strings.

A detected character string may include a numeral, a sign, and others.

Figure 3:
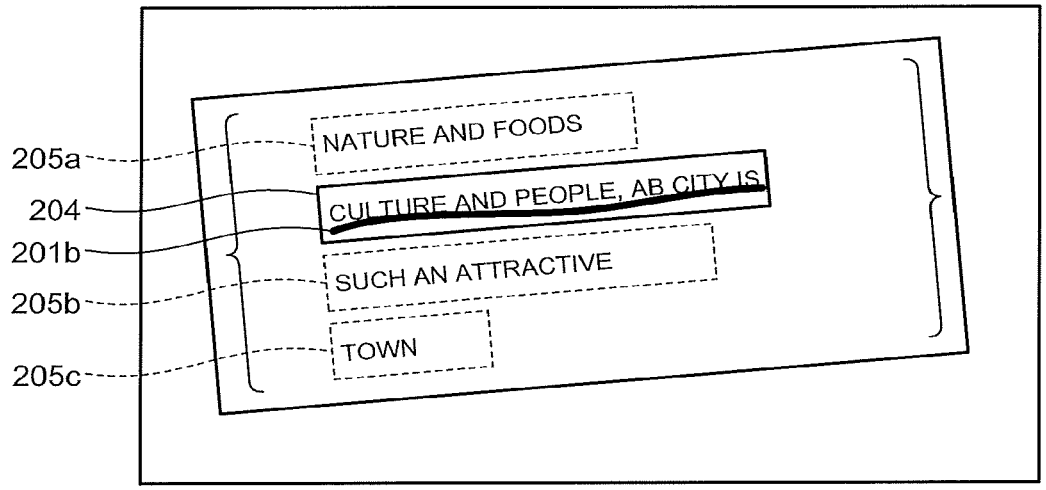
FIG. 3 is a drawing that illustrates an exemplary character string detected from an image by a detecting unit of the embodiment.

FIG. 3 is a drawing that illustrates an exemplary character string detected from an image by the detecting unit 6 of the embodiment. In the example of FIG. 3, a character string included in a character string field 204 is detected by the detecting unit 6 as a character string having the smallest distance to the position of the input information 201b. The character strings included in character string fields 205a to 205c are not detected by the detecting unit 6 because the respective distances to the position of the input information 201b are not the smallest.

For example, methods described in Japanese Patent Application Laid-open No. 2016-004553 and in Tonouchi Y., Suzuki K., Osada K., A Hybrid Approach to Detect Texts in Natural Scenes by Integration of a Connected-Component Method and a Sliding-Window Method, IWRR 2014 (Singapore) are applicable to the detection processing for detecting the character string field 204.

Figure 4:
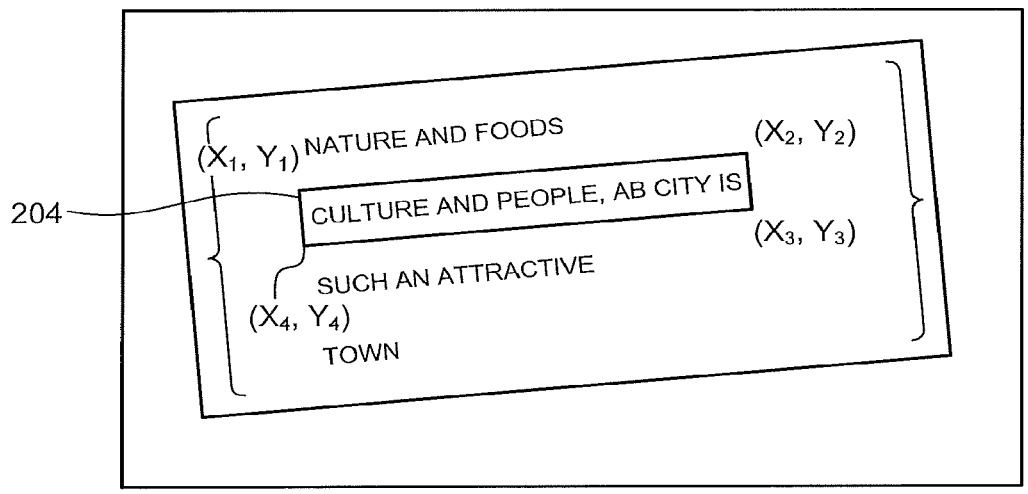
FIG. 4 is a drawing that illustrates exemplary information specifying a field of the character string of the embodiment.

FIG. 4 is a drawing that illustrates exemplary information specifying the character string field 204 of the embodiment. In the example of FIG. 4, the character string field 204 is specified with four vertexes (X1, Y1) to (X4, Y4).

Exemplary Calculation of Distance

A method of calculating the distance between the position of the input information 201b (see FIG. 3) and the character string field 204 will be described with reference to the case that specifies the character string field 204 with four vertexes (X1, Y1) to (X4, Y4).

The detecting unit 6 calculates the coordinates of the center of gravity of the input information 201b using the following expression (1).

$$\left(\frac{1}{K}\sum_{k=1}^{K} x_k, \frac{1}{K}\sum_{k=1}^{K} y_k\right) \tag{1}$$

The detecting unit 6 calculates the coordinates of the center of gravity of the character string field 204 using the following expression (2).

$$\left(\frac{1}{4}\sum_{k=1}^{4} X_k, \frac{1}{4}\sum_{k=1}^{4} Y_k\right) \tag{2}$$

The detecting unit 6 further calculates the distance between the position of the input information 201b and the character string field 204 based on the Euclidean distance between the center of gravity of the input information 201b and the center of gravity of the character string field 204.

The Euclidean distance between two points (x1, y1) and (x2, y2) is calculated using the following expression (3).

$$\sqrt{(x_1-x_2)^2+(y_1-y_2)^2} \tag{3}$$

As described above, in the image processing device 100 of the embodiment, the receiving unit 4 receives input information input to an image. The specifying unit 5 specifies the position of the input information 201. The detecting unit 6 detects, from the image, a character string having a smaller distance to the position of the input information 201 than other character strings. This manner enables the image processing device 100 of the embodiment to more accurately detect a character string with a simple operation input.

First Modification of the Embodiment

A first modification of the embodiment will now be described. In describing the first modification of the embodiment, description will be focused on the points different from the embodiment, and the same description as the embodiment will be therefore omitted. Limiting the detection range of a character string will be described in the first modification of the embodiment.

Exemplary Detection Range

Figure 5:
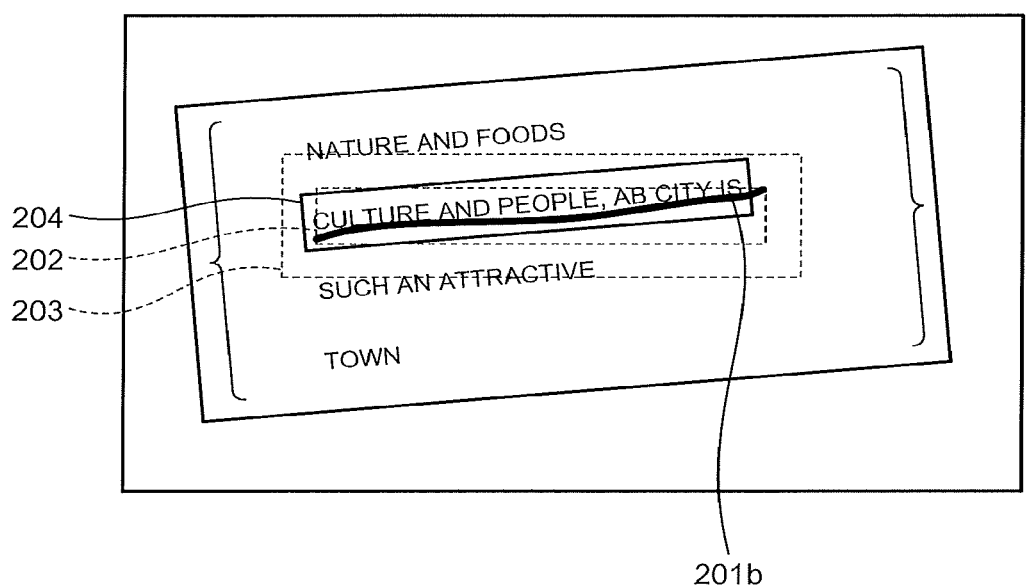
FIG. 5 is a drawing that illustrates an exemplary detection range of a first modification of the embodiment.

FIG. 5 is a drawing that illustrates an exemplary detection range of the first modification of the embodiment. The specifying unit 5 specifies the input information 201b input through an operation input of the user. The detecting unit 6 detects a rectangular field 202 circumscribed to the input information 201b. The detecting unit 6 further sets a detection range 203 by longitudinally and laterally extending the rectangular field 202 at a certain magnification. The detecting unit 6 detects the character string field 204 from the detection range 203 limited as a field including the input information 201.

If the detection range 203 includes a plurality of character strings, the detecting unit 6 detects a character string having the smaller distance to the position of the input information 201b than the other character strings. If the detection range 203 includes a plurality of character strings, for example, the detecting unit 6 detects a character string having the smallest distance to the position of the input information 201b. In another case, the detecting unit 6 detects a certain number of character strings in ascending order from a character string having the smallest distance, out of a plurality of character strings.

As described above, in the image processing device 100 of the first modification of the embodiment, the detecting unit 6 detects a character string from the detection range 203 limited in the image. This manner enables the image processing device 100 of the first modification of the embodiment to quickly detect a character string compared with the image processing device of the embodiment.

Second Modification of the Embodiment

A second modification of the embodiment will now be described. In describing the second modification of the embodiment, description will be focused on the points different from the embodiment, and the same description as the embodiment will be therefore omitted. In the example of the second modification, a character string is detected based on the direction of the input information 201b and the direction of the character string.

Exemplary Method of Calculating the Direction of Input Information

The specifying unit 5 specifies the direction of the input information 201b. More specifically, the specifying unit 5 calculates a mean vector from the sequence of points, $p(k)=(x_k, y_k)$ ($k=1, 2, \ldots, K$), of the input information 201b using the following expression (4).

$$(\bar{x}, \bar{y}) = \frac{1}{K} \sum_{i=1}^{K} \begin{bmatrix} x_i \\ y_i \end{bmatrix} \quad (4)$$

Based on the sequence of points, $p(k)=(x_k, y_k)$ ($k=1, 2, \ldots, K$), of the input information 201b and the mean vector, the specifying unit 5 thereafter calculates a covariance matrix using the following expression (5).

$$\frac{1}{K} \sum_{i=1}^{K} \begin{bmatrix} (x_i - \bar{x})(x_i - \bar{x}) & (x_i - \bar{x})(y_i - \bar{y}) \\ (y_i - \bar{y})(x_i - \bar{x}) & (y_i - \bar{y})(y_i - \bar{y}) \end{bmatrix} \quad (5)$$

The specifying unit 5 further calculates the eigenvalues and the eigenvectors of the covariance matrix and specifies the direction of the input information 201b based on the direction of the eigenvector corresponding to a larger eigenvalue of two eigenvalues.

The detecting unit 6 detects, from the image, a character string in which a distance between the character string and the position of the input information 201b is equal to or smaller than a threshold (a first threshold) and difference in direction between the character string and the input information 201b is equal to or smaller than a threshold (a second threshold).

In the case of including a plurality of detected character strings, for example, the detecting unit 6 detects a character string having the smaller distance to the position of the input information 201b than other character strings. In the case of including a plurality of detected character strings, for example, the detecting unit 6 detects a character string having the smallest distance to the position of the input information 201b. In another case, the detecting unit 6 detects a certain number of character strings in ascending order from a character string having the smallest distance, out of a plurality of character strings.

If a plurality of detected character strings are included, for example, the detecting unit 6 detects a character string having a small difference in direction between the character string and the input information 201b compared with other character strings. Specifically, if a plurality of detected character strings are included, for example, the detecting unit 6 detects a character string having the smallest difference in direction between the character string and the input information 201b. In another case, the detecting unit 6 detects a certain number of character strings in ascending order from a character string having the smallest difference in direction between the character string and the input information 201b of the character strings.

As described above, in the image processing device 100 of the second modification of the embodiment, the detecting unit 6 detects, from the image, a character string in which a distance between the character string and the position of the input information 201b is equal to or smaller than a threshold and difference in direction between the character string and the input information 201b is equal to or smaller than a threshold. This manner enables the image processing device 100 of the second modification of the embodiment to accurately detect a character string compared with the image processing device of the embodiment.

Third Modification of the Embodiment

A third modification of the embodiment will now be described. In describing the third modification of the embodiment, description will be focused on the points different from the second modification of the embodiment, and the same description as the second modification of the embodiment will be therefore omitted. In the example of the third modification, the detection range 203 is set based on the direction of the input information 201b and the direction of the character string.

The detecting unit 6 sets a detection range having a side parallel with the direction of the input information 201b.

Figure 6A:
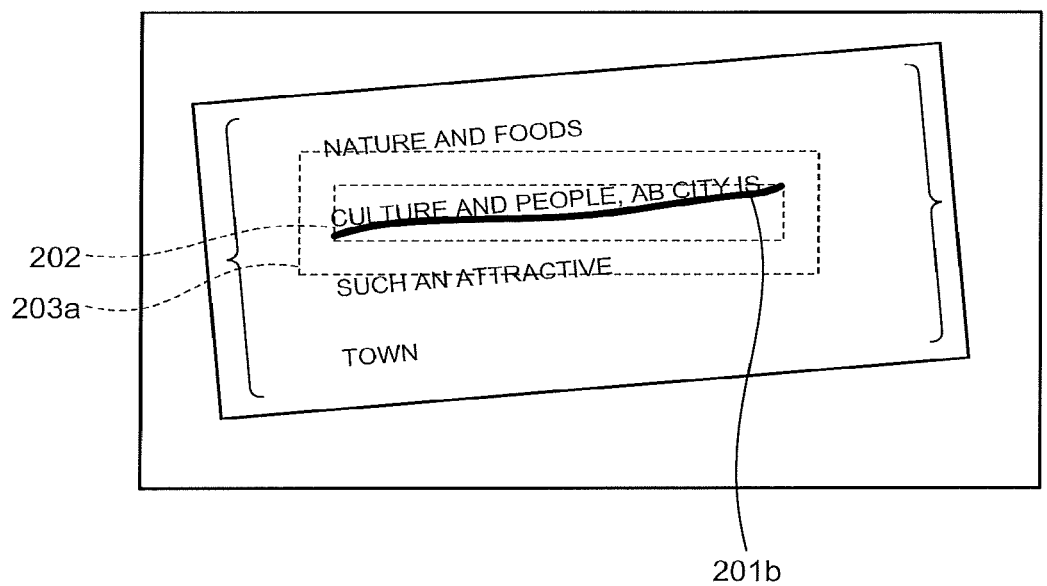
FIG. 6A is a drawing that illustrates an exemplary detection range of the first modification of the embodiment.
Figure 6B:
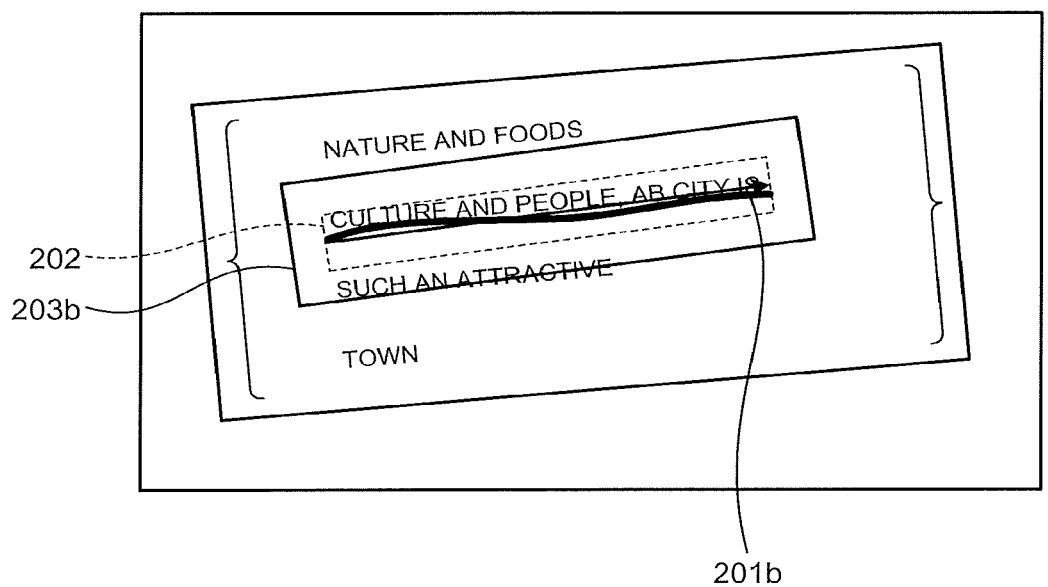
FIG. 6B is a drawing that illustrates an exemplary detection range of a third modification of the embodiment.

FIG. 6A is a drawing that illustrates an exemplary detection range of the first modification of the embodiment, whereas FIG. 6B is a drawing that illustrates an exemplary detection range of the third modification of the embodiment. A detection range 203a of FIG. 6A has no sides parallel with the direction of the input information 201b, whereas a detection range 203b of FIG. 6B has sides parallel with the direction of the input information 201b. The detecting unit 6 of the third modification of the embodiment therefore sets the detection range 203b of FIG. 6B.

Specifically, the specifying unit 5 specifies the input information 201b input through an operation input of the user. The detecting unit 6 detects a rectangular field 202 circumscribed to the input information 201b. The detecting unit 6 further sets the detection range 203b by longitudinally and laterally extending the rectangular field 202 at a certain magnification. The detecting unit 6 detects, from the detection range 203b, a character string in which a distance between the character string and the position of the input information 201b is equal to or smaller than a threshold (a first threshold) and difference in direction between the character string and the input information 201b is equal to or smaller than another threshold (a second threshold).

As described above, in the image processing device 100 of the third modification of the embodiment, the detecting unit 6 detects, from the detection range 203b, a character string in which a distance between the character string and the position of the input information 201b is equal to or smaller than a threshold and difference in direction between the character string and the input information 201b is equal to or smaller than another threshold. This manner enables the image processing device 100 of the third modification of the embodiment to appropriately set the detection range 203b and thus accurately detect a character string compared with the image processing device 100 of the embodiment.

Fourth Modification of the Embodiment

A fourth modification of the embodiment will now be described. In describing the fourth modification of the embodiment, description will be focused on the points different from the second modification of the embodiment, and the same description as the second modification of the embodiment will be therefore omitted. In the fourth modification of the embodiment, the detection range 203 of a character string is changed based on the elevation angle of an imaging unit (such as a camera) of when the image has been taken.

Figure 7:
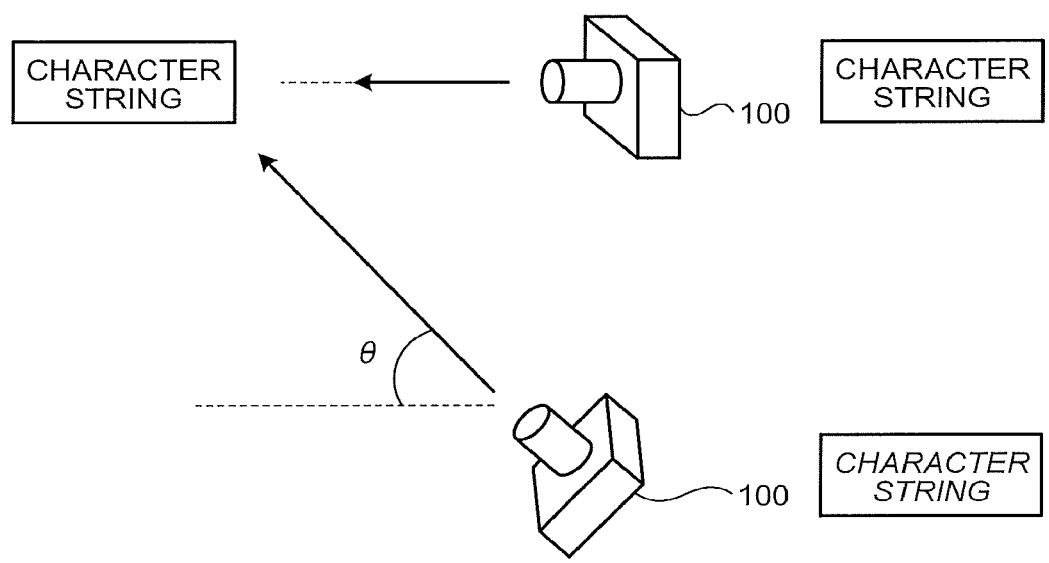
FIG. 7 is an illustrative drawing of the relation between an elevation angle θ and a character string of a fourth modification of the embodiment.
Figure 8:
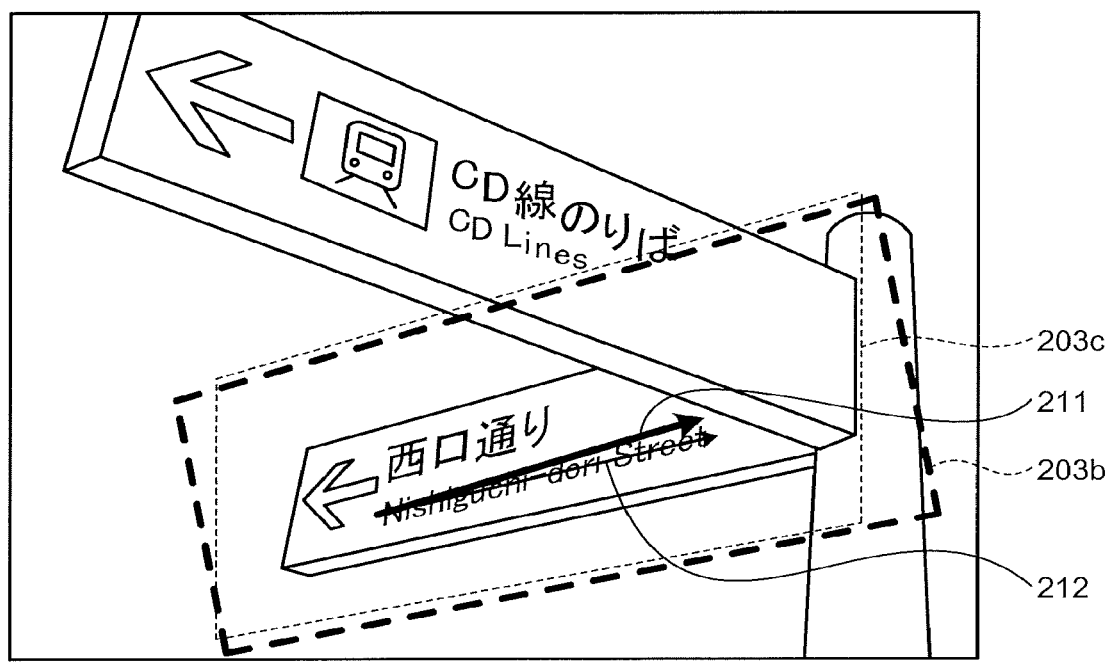
FIG. 8 is a drawing that illustrates an exemplary detection range of the fourth modification of the embodiment.

FIG. 7 is an illustrative drawing of the relation between an elevation angle θ and a character string of the fourth modification of the embodiment. FIG. 8 is a drawing that illustrates an exemplary detection range of the fourth modification of the embodiment. In the example of FIG. 7, the acquiring unit 1 of the image processing device 100 is an imaging unit of a camera or the like. As illustrated in FIG. 7, the shape of a character string included in the image acquired by the imaging unit is changed according to the elevation angle θ of the imaging unit. The detecting unit 6 therefore changes the detection ranges according to the elevation angle θ of the imaging unit of when the image has been taken.

The direction of the short axis of the detection range will be described with reference to FIG. 8. The detecting unit 6 changes the directions of the short axis of the detection range according to the elevation angle θ of the imaging unit of when the image has been taken. Specifically, if the elevation angle θ of the imaging unit of when the image has been taken is smaller than a threshold (a third threshold), the detecting unit 6 detects a character string from a detection range (a first detection range) formed with sides whose directions coincide with the direction of the character string and sides whose directions are perpendicular to the direction of the character string. In the example of FIG. 8, the first detection range corresponds to the rectangular detection range 203b. The direction of the short axis of the detection range 203b is perpendicular to the direction of the character string.

Moreover, if the elevation angle of the imaging unit of when the image has been taken is equal to or greater than the threshold (the third threshold), the detecting unit 6 detects a character string from a detection range (a second detection range) formed with sides whose directions coincide with the vertical direction or the horizontal direction of the image and sides whose directions coincide with the direction of the character string. In the example of FIG. 8, the second detection range corresponds to a parallelogram detection range 203c. The direction of the short axis of the detection range 203c is perpendicular to the horizontal direction of the image.

Any method of acquiring the elevation angle of the imaging unit is applicable. For example, the elevation angle of the imaging unit can be acquired by the method described in Japanese Patent Application Laid-open No. 2016-045877.

Exemplary Transformation of Detection Range

The detecting unit 6 transforms the image in the second detection range such that the direction of the character string included in the second detection range becomes horizontal or vertical and detects the character string from the transformed image in the second detection range. For example, the detecting unit 6 transforms the four vertexes (X1, Y1), (X2, Y2), (X3, Y3), (X4, Y4) of the detection range 203c in a manner of forming a rectangle having a width W and a height H with four vertexes (0, 0), (W, 0), (W, H), (0, H). More specifically, the detecting unit 6 transforms the detection range 203c by the homography.

The projection matrix used in the homography is calculated based on the relation between the four vertexes {(X1, Y1), (X2, Y2), (X3, Y3), (X4, Y4)} before the transformation and the four vertexes {(0, 0), (W, 0), (W, H), (0, H)} after the transformation. The detecting unit 6 transforms the coordinates of a point included in the detection range 203c using the calculated projection matrix.

For example, the detecting unit 6 detects a character string from the detection range 203c having undergone the homography.

Figure 9A:
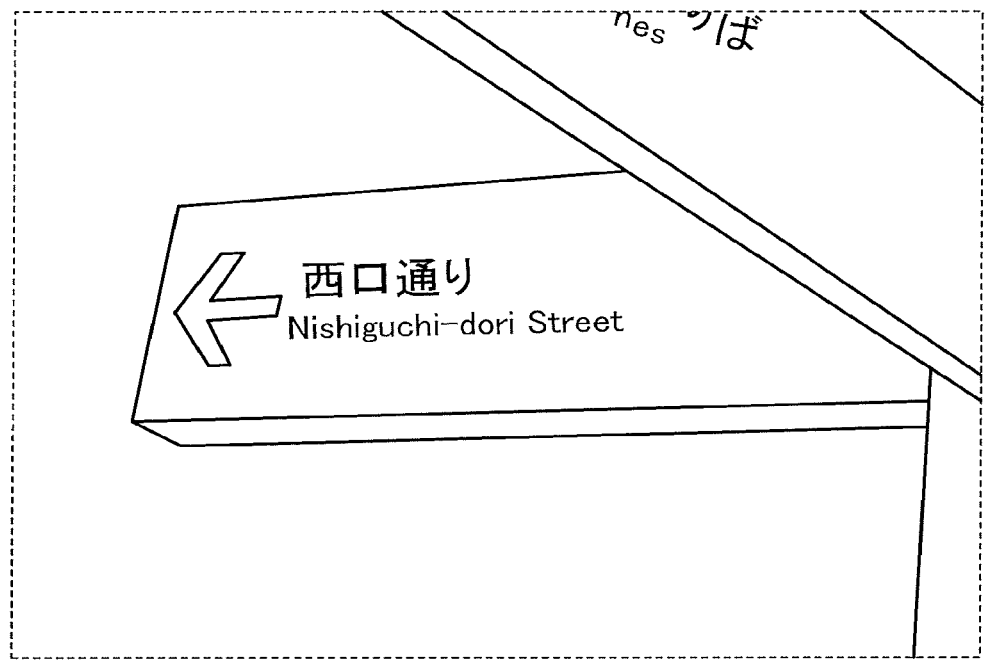
FIG. 9A is a drawing that illustrates a first example of the detection range of the fourth modification having undergone a homography.

FIG. 9A is a drawing that illustrates a first example of the detection range of the fourth modification having undergone the homography. FIG. 9A illustrates the second detection range (the detection range 203c of FIG. 8) having undergone the homography.

The detecting unit 6 may transform the image in the first detection range (the detection range 203b of FIG. 8) such that the direction of the character string included in the first detection range becomes horizontal or vertical and detect the character string from the transformed image in the first detection range.

Figure 9B:
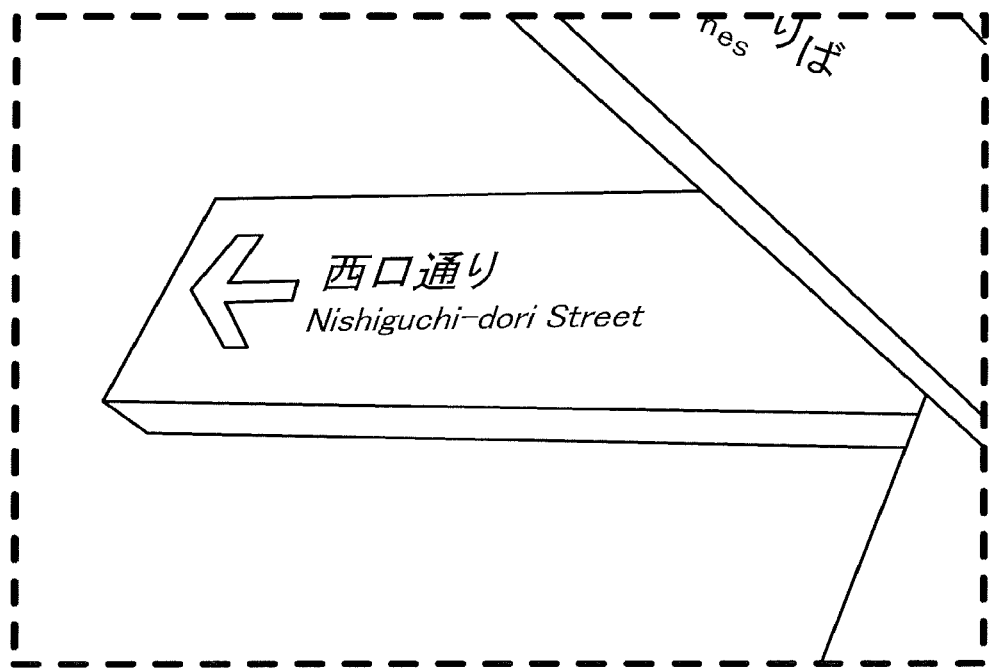
FIG. 9B is a drawing that illustrates a second example of the detection range of the fourth modification in the embodiment having undergone a homography.

FIG. 9B is a drawing that illustrates a second example of the detection range of the fourth modification in the embodiment having undergone the homography. FIG. 9B illustrates the first detection range (the detection range 203b of FIG. 8) having undergone the homography.

In the example of FIG. 8, the character string included in the second detection range (the detection range 203c) having undergone the homography (see FIG. 9A) is less distorted than the character string in the first detection range (the detection range 203b) having undergone the homography (see FIG. 9B).

In the above-described example of FIG. 8, the directions of the long axes of the detection ranges 203b and 203c correspond to a direction 212 of the character string specified from a direction 211 of the input information 201b. The short axes of the detection ranges 203b and 203c are changed based on the elevation angle θ of the imaging unit.

The detecting unit 6 may change the short axes by another method other than the above-described method. For example, with the elevation angle θ of the imaging unit arranged horizontally or downwardly, the detecting unit 6 may determine the direction perpendicular to the direction 212 of the character string to be the short axis direction (the detection range 203b). In another case, distortion is likely to be caused on the image with the elevation angle θ of the imaging unit arranged upwardly. In this case, the detecting unit 6 may determine the vertical direction of the image to be the short axis direction (the detection range 203c).

In the image processing device 100 of the fourth modification of the embodiment, the detecting unit 6 changes the detection ranges 203 of a character string based on the elevation angle θ of an imaging unit (such as a camera) of when the image has been taken. This manner enables the image processing device 100 of the fourth modification of the embodiment to appropriately set the detection range 203 and thus accurately detect a character string compared with the image processing device 100 of the embodiment. The detecting unit 6 is further capable of accurately detecting a character string by correcting the line direction (horizontally and vertically rotating the direction of the character string) and correcting distortion on the character string.

In the image processing device 100 of the fourth modification of the embodiment, for example, the detecting unit 6 detects a character string from the detection range 203c having undergone the homography. This manner enables the image processing device 100 of the fourth modification of the embodiment to correct distortion on a detected character string and thus more accurately detect the character string.

Fifth Modification of the Embodiment

A fifth modification of the embodiment will now be described. In describing the fifth modification of the embodiment, description will be focused on the points different from the first modification of the embodiment, and the same description as the first modification of the embodiment will be therefore omitted. In the fifth modification of the embodiment, the shape of the input information 201 is not a line like the input information 201b (see FIG. 2B). In this example, the input information 201 is in the shape of the input information 201c (see FIG. 2C).

Figure 10:
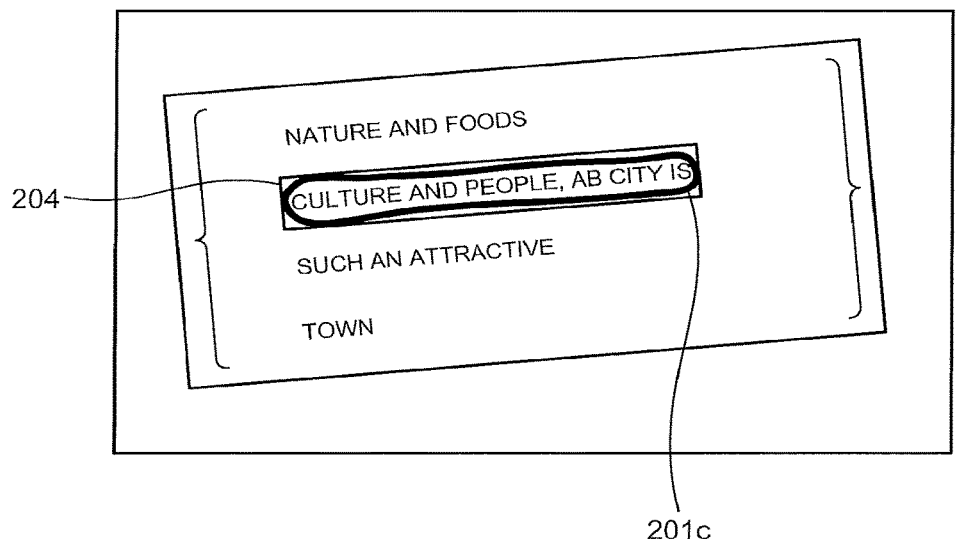
FIG. 10 is a drawing that illustrates exemplary input information of a fifth modification of the embodiment.

FIG. 10 is a drawing that illustrates exemplary input information 201c of the fifth modification of the embodiment. The specifying unit 5 specifies the input information 201c input through an operation input of the user. The detecting unit 6 detects the rectangular field 202 circumscribed to the input information 201c. The subsequent processing is the same as that in the first modification of the embodiment and will be thus omitted.

As described above, the image processing device 100 of the fifth modification of the embodiment is capable of accurately detecting a character string even if the input information 201 is in such a shape as the input information 201c.

Effects of Embodiment and First to Fifth Modifications

As described above, the image processing device 100 of the embodiment and the first to the fifth modifications allows the user to instruct the position of a target character string with a simple operation input. For example, with a device having a liquid crystal touch panel, such as a smartphone and a tablet, the user only needs to make an operation input by, for example, moving his/her fingers along the direction of the character string on the display screen displaying an image around the field thereof where the character string is displayed. The above-described image processing device 100 of the embodiment and the first to the fifth modifications is capable of accurately specifying the position and the line direction of a target character string targeted by the user with a simple operation input such as tracing.

Furthermore, limiting the detection range 203 as described in the first and the third to the fifth modifications of the embodiment eliminates the necessity of detecting all the character strings in the image. In other words, the image processing device only needs to detect one target character string targeted by the user from the limited detection range 203, which enables high-speed processing.

Furthermore, even when the character string in the image is deeply inclined or distorted based on the relative relation between the imaged character string and the imaging unit, the character string can be accurately detected by changing and transforming the detection range 203 as described in the fourth modification of the embodiment.

An exemplary hardware configuration of the image processing device 100 of the embodiment will now be described.

Exemplary Hardware Configuration

Figure 11:
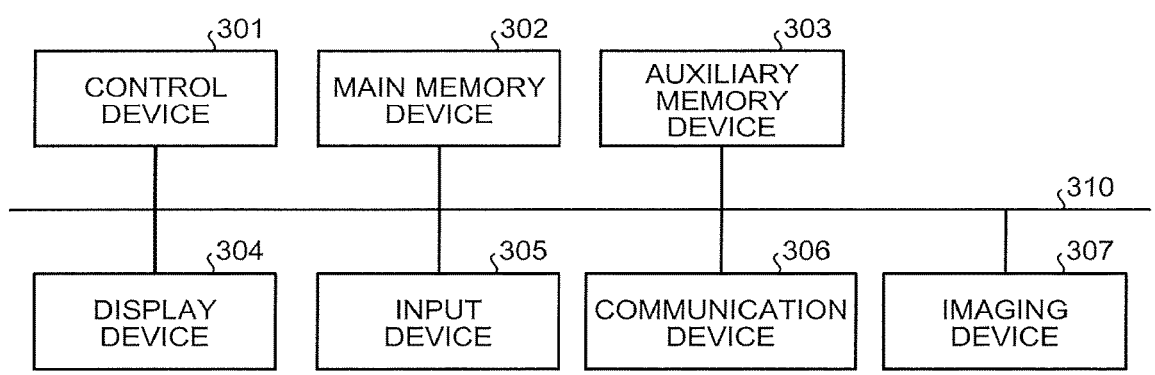
FIG. 11 is a drawing that illustrates an exemplary hardware configuration of the image processing device of the embodiment.

FIG. 11 is a drawing that illustrates an exemplary hardware configuration of the image processing device 100 of the embodiment. The image processing device 100 of the embodiment includes a control device 301, a main memory device 302, an auxiliary memory device 303, a display device 304, an input device 305, a communication device 306, and an imaging device 307. The control device 301, the main memory device 302, the auxiliary memory device 303, the display device 304, the input device 305, the communication device 306, and the imaging device 307 are connected with one another via a bus 310.

The control device 301 executes a computer program read from the auxiliary memory device 303 onto the main memory device 302. The control device 301 is, for example, a processor or processors such as a CPU. The earlier-described receiving unit 4, the specifying unit 5, and the detecting unit 6 are implemented by, for example, the control device 301. The main memory device 302 is a memory such as a read only memory (ROM) and a random access memory (RAM). The auxiliary memory device 303 is a memory card, a hard disk drive (HDD), or the like.

The display device 304 displays information. Examples of the display device 304 include a liquid crystal display. The earlier-described display unit 2 is implemented by, for example, the display device 304. The input device 305 receives an input of information. Examples of the input device 305 include a keyboard and a mouse. The earlier-described input unit 3 is implemented by, for example, the input device 305. Examples of the display device 304 and the input device 305 may include a liquid crystal touch panel with a display function and an input function. The communication device 306 communicates with other devices. The imaging device 307 takes images such as a scenery image. The earlier-described acquiring unit 1 is implemented by, for example, the communication device 306 and the imaging device 307.

The program executed by the image processing device 100 of the embodiment is stored in a computer-readable memory medium such as a CD-ROM, a memory card, a CD-R, a digital versatile disc (DVD), and the like and is provided as a computer program product in an installable or executable file.

The program executed by the image processing device 100 of the embodiment may be stored in a computer connected to a network such as the Internet and provided by being downloaded via the network. In another manner, the program executed by the image processing device 100 of the embodiment may be provided through a network such as the Internet without being downloaded.

The program executed by the image processing device 100 of the embodiment may be preliminarily embedded in a ROM or the like and provided.

The program executed by the image processing device 100 of the embodiment is configured in a module including computer-executable functions of the functional configuration of the image processing device 100 of the embodiment. The functions implemented by the program are loaded onto the main memory device 302 with the control device 301 reading the program from a memory medium such as the auxiliary memory device 303 and executing the program. In other words, the functions implemented by the program are generated on the main memory device 302.

Some of the functions of the image processing device 100 of the embodiment may be implemented by hardware such as an integrated circuit (IC). Examples of the IC include a processor executing dedicated processing.

In implementing the functions using a plurality of processors, each processor may implement one of the functions or two or more functions out of the functions.

The image processing device 100 of the embodiment operates in any feature. For example, the image processing device 100 of the embodiment may operate as a cloud system on a network.

While certain embodiments have been described, these embodiments have been presented by way of example only, and are not intended to limit the scope of the inventions. Indeed, the novel embodiment described herein may be embodied in a variety of other forms; furthermore, various omissions, substitutions and changes in the form of the embodiment described herein may be made without departing from the spirit of the inventions. The accompanying claims and their equivalents are intended to cover such forms or modifications as would fall within the scope and spirit of the inventions.

What is claimed is:

1. An image processing device, comprising:
a memory; and
one or more hardware processors configured to function as a receiving unit, a specifying unit, and a detecting unit, wherein
the receiving unit receives input information input to an image,
the specifying unit specifies a position of the input information, and
the detecting unit detects a character string for which a distance between the character string and the position is equal to or smaller than a first threshold and a difference in a direction between the character string and the input information is equal to or smaller than a second threshold, from the image, wherein
the detecting unit detects the character string from a first detection range formed with a side whose direction coincides with the direction of the character string and a side whose direction is perpendicular to the direction of the character string when an elevation angle of an imaging device of when the image has been taken is smaller than a third threshold, and detects the character string from a second detection range formed with a side whose direction coincides with a vertical direction or a horizontal direction of the image and a side whose direction coincides with the direction of the character string when the elevation angle of the imaging device of when the image has been taken is equal to or greater than the third threshold.

2. The device according to claim 1, wherein the detecting unit sets a detection range having a side parallel with the direction of the input information and detects the character string for which the distance between the character string and the position is equal to or smaller than the first threshold and the difference in direction between the character string and the input information is equal to or smaller than the second threshold, from the detection range.

3. The device according to claim 1, wherein the detecting unit transforms an image in the second detection range such that the direction of the character string included in the second detection range becomes horizontal or vertical and detects the character string from the transformed image in the second detection range.

4. The device according to claim 1, wherein the detecting unit transforms an image in the first detection range such that the direction of the character string included in the first detection range becomes horizontal or vertical and detects the character string from the transformed image in the first detection range.

5. An image processing method, comprising:
receiving input information input to an image;
specifying a position of the input information; and
detecting a character string for which a distance between the character string and the position is equal to or smaller than a first threshold and a difference in a direction between the character string and the input information is equal to or smaller than a second threshold, from the image, wherein
the detecting detects the character string from a first detection range formed with a side whose direction coincides with the direction of the character string and a side whose direction is perpendicular to the direction of the character string when an elevation angle of an imaging device of when the image has been taken is smaller than a third threshold, and detects the character string from a second detection range formed with a side whose direction coincides with a vertical direction or a horizontal direction of the image and a side whose direction coincides with the direction of the character string when the elevation angle of the imaging device of when the image has been taken is equal to or greater than the third threshold.

6. The method according to claim 5, wherein the detecting sets a detection range having a side parallel with the direction of the input information and detects the character string for which the distance between the character string and the position is equal to or smaller than the first threshold and the difference in direction between the character string and the input information is equal to or smaller than the second threshold, from the detection range.

7. The method according to claim 5, wherein the detecting transforms an image in the second detection range such that the direction of the character string included in the second detection range becomes horizontal or vertical and detects the character string from the transformed image in the second detection range.

8. The method according to claim 5, wherein the detecting transforms an image in the first detection range such that the direction of the character string included in the first detection range becomes horizontal or vertical and detects the character string from the transformed image in the first detection range.

9. A computer program product comprising a non-transitory computer readable medium including programmed instructions, the instructions causing a computer to function as:
a receiving unit configured to receive input information input to an image;
a specifying unit configured to specify a position of the input information; and
a detecting unit configured to detect a character string for which a distance between the character string and the position is equal to or smaller than a first threshold and a difference in a direction between the character string and the input information is equal to or smaller than a second threshold, from the image, wherein
the detecting unit detects the character string from a first detection range formed with a side whose direction coincides with the direction of the character string and a side whose direction is perpendicular to the direction of the character string when an elevation angle of an imaging device of when the image has been taken is smaller than a third threshold, and detects the character string from a second detection range formed with a side whose direction coincides with a vertical direction or a horizontal direction of the image and a side whose direction coincides with the direction of the character string when the elevation angle of the imaging device of when the image has been taken is equal to or greater than the third threshold.

10. The product according to claim 9, wherein the detecting unit sets a detection range having a side parallel with the direction of the input information and detects the character string for which the distance between the character string and the position is equal to or smaller than the first threshold and the difference in direction between the character string and the input information is equal to or smaller than the second threshold, from the detection range.

11. The product according to claim 9, wherein the detecting unit transforms an image in the second detection range such that the direction the character string included in the second detection range becomes horizontal or vertical and detects the character string from the transformed image in the second detection range.

\* \* \* \* \*